(12) United States Patent
Rivard

(10) Patent No.: US 11,001,427 B2
(45) Date of Patent: May 11, 2021

(54) TIE WRAP CONNECTOR AND STRAP KIT

(71) Applicant: 9191-1230 QUÉBEC INC., Vaudreuil-Dorion (CA)

(72) Inventor: Louis-Philippe Rivard, Saint-Colomban (CA)

(73) Assignee: 9191-1230 QUÉBEC INC., Vaudreuil-Dorion (CA)

( * ) Notice: Subject to any disclaimer, the term of this patent is extended or adjusted under 35 U.S.C. 154(b) by 0 days.

(21) Appl. No.: 16/590,517

(22) Filed: Oct. 2, 2019

(65) Prior Publication Data
US 2020/0031547 A1 Jan. 30, 2020

Related U.S. Application Data

(63) Continuation of application No. 15/774,115, filed as application No. PCT/CA2016/051331 on Nov. 16, 2016, now Pat. No. 10,472,149.

(60) Provisional application No. 62/256,430, filed on Nov. 17, 2015.

(51) Int. Cl.
| | |
|---|---|
| *B65D 63/16* | (2006.01) |
| *B65D 63/10* | (2006.01) |
| *F16B 2/08* | (2006.01) |
| *F16B 2/14* | (2006.01) |

(52) U.S. Cl.
CPC ......... *B65D 63/16* (2013.01); *B65D 63/1036* (2013.01); *F16B 2/08* (2013.01); *F16B 2/14* (2013.01); *B65D 2563/101* (2013.01)

(58) Field of Classification Search
CPC .......... B65D 2563/101; B65D 63/1036; B65D 63/16; B65D 71/502; B65D 81/05; B65D 85/671; F16B 2/08; F16B 2/14
See application file for complete search history.

(56) References Cited

U.S. PATENT DOCUMENTS

| | | | | |
|---|---|---|---|---|
| 2,740,654 A | * | 4/1956 | Orschel ................ | G09F 3/0352 |
| | | | | 292/323 |
| 4,498,507 A | * | 2/1985 | Thompson ........... | B65B 13/345 |
| | | | | 140/93.2 |
| 4,574,434 A | * | 3/1986 | Shupe .................. | B65D 63/14 |
| | | | | 24/16 PB |
| 4,665,588 A | * | 5/1987 | Nakano ................ | F16B 2/08 |
| | | | | 24/16 PB |
| 4,993,669 A | * | 2/1991 | Dyer .................... | B65D 63/16 |
| | | | | 24/16 PB |

(Continued)

*Primary Examiner* — Robert Sandy
*Assistant Examiner* — David M Upchurch
(74) *Attorney, Agent, or Firm* — Benoit & Cote, Inc.; C. Marc Benoit

(57) ABSTRACT

A connector to be used with a strap for wrapping an object. The strap is detached from the connector and has first and second extremities. The connector has a first passage adapted to insert and to lock the first extremity of the strap therein and a second passage having an entrance adapted to insert the second extremity of the strap therein and to prevent the strap from travelling toward the entrance upon insertion. It has a body having a first section with the first passage and a second section with the second passage, wherein the first section has a vertical wall and the second section has a vertical wall distinct from and facing the vertical wall of the first section, and a bridge joining the first and second sections of the body by extending between the vertical wall of the first section and the vertical wall of the second section.

20 Claims, 16 Drawing Sheets

(56) References Cited

U.S. PATENT DOCUMENTS

| | | | | |
|---|---|---|---|---|
| 5,102,075 A * | 4/1992 | Dyer | ............... | B65D 63/16 |
| | | | | 24/16 PB |
| 5,479,797 A * | 1/1996 | Peterson | ............... | A44C 5/2076 |
| | | | | 24/16 PB |
| 5,544,391 A * | 8/1996 | Hoffman | ............... | B65D 63/14 |
| | | | | 24/16 PB |
| 5,802,675 A * | 9/1998 | Parsons | ............... | E05B 75/00 |
| | | | | 24/16 PB |
| 6,047,448 A * | 4/2000 | Arnold | ............... | F16L 3/2336 |
| | | | | 24/16 PB |
| 6,532,631 B2 * | 3/2003 | Rohaly | ............... | B65D 63/16 |
| | | | | 24/16 PB |
| 2007/0067965 A1 * | 3/2007 | Sugiyama | ............... | B65D 63/14 |
| | | | | 24/16 PB |
| 2007/0119030 A1 * | 5/2007 | Hoffman | ............... | B65D 63/14 |
| | | | | 24/16 PB |
| 2007/0234524 A1 * | 10/2007 | Witt | ............... | B65D 63/14 |
| | | | | 24/16 PB |
| 2016/0280433 A1 * | 9/2016 | Montejo | ............... | B65D 63/16 |
| 2016/0325897 A1 * | 11/2016 | Kierstead | ............... | B65D 63/1027 |

\* cited by examiner

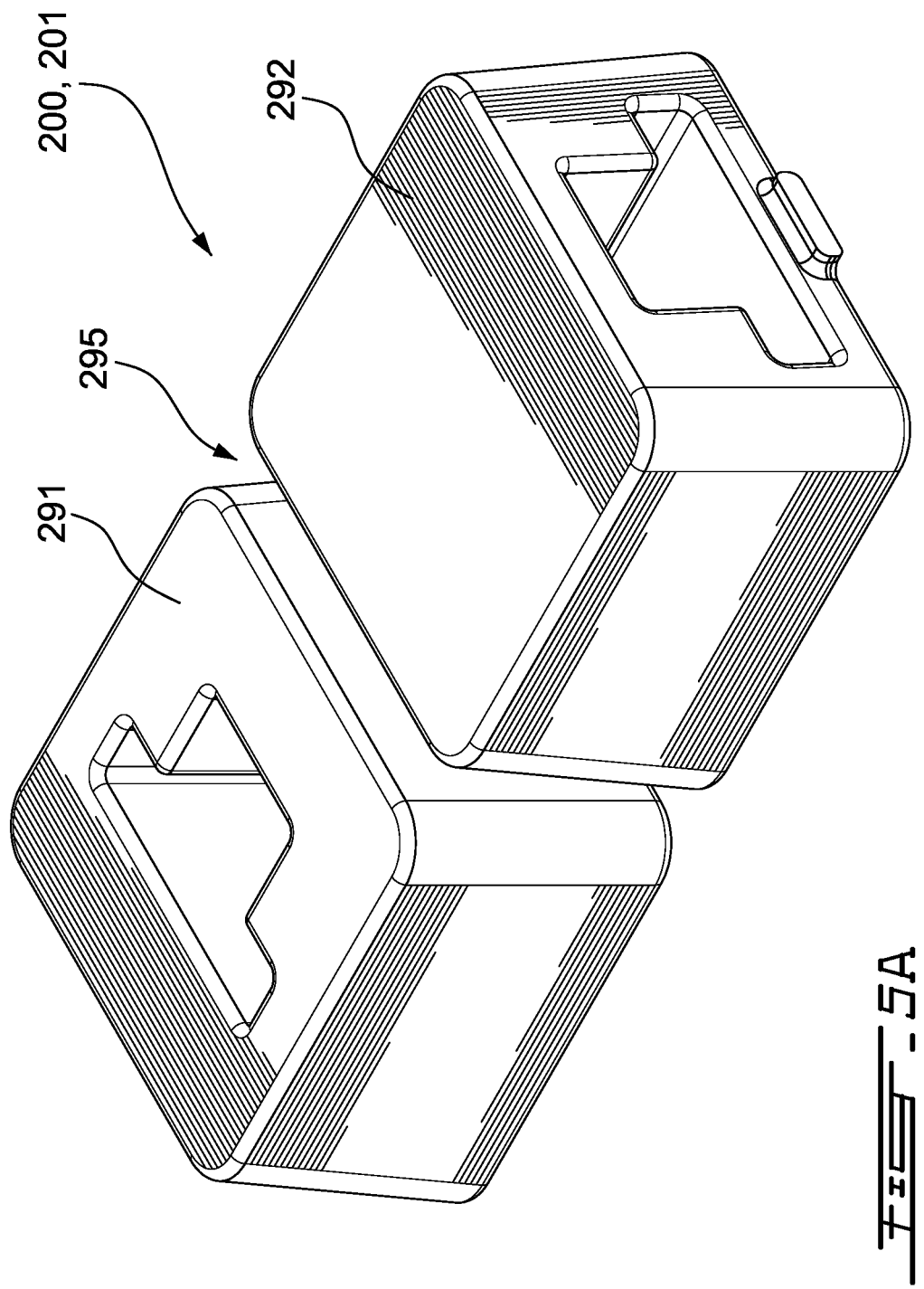

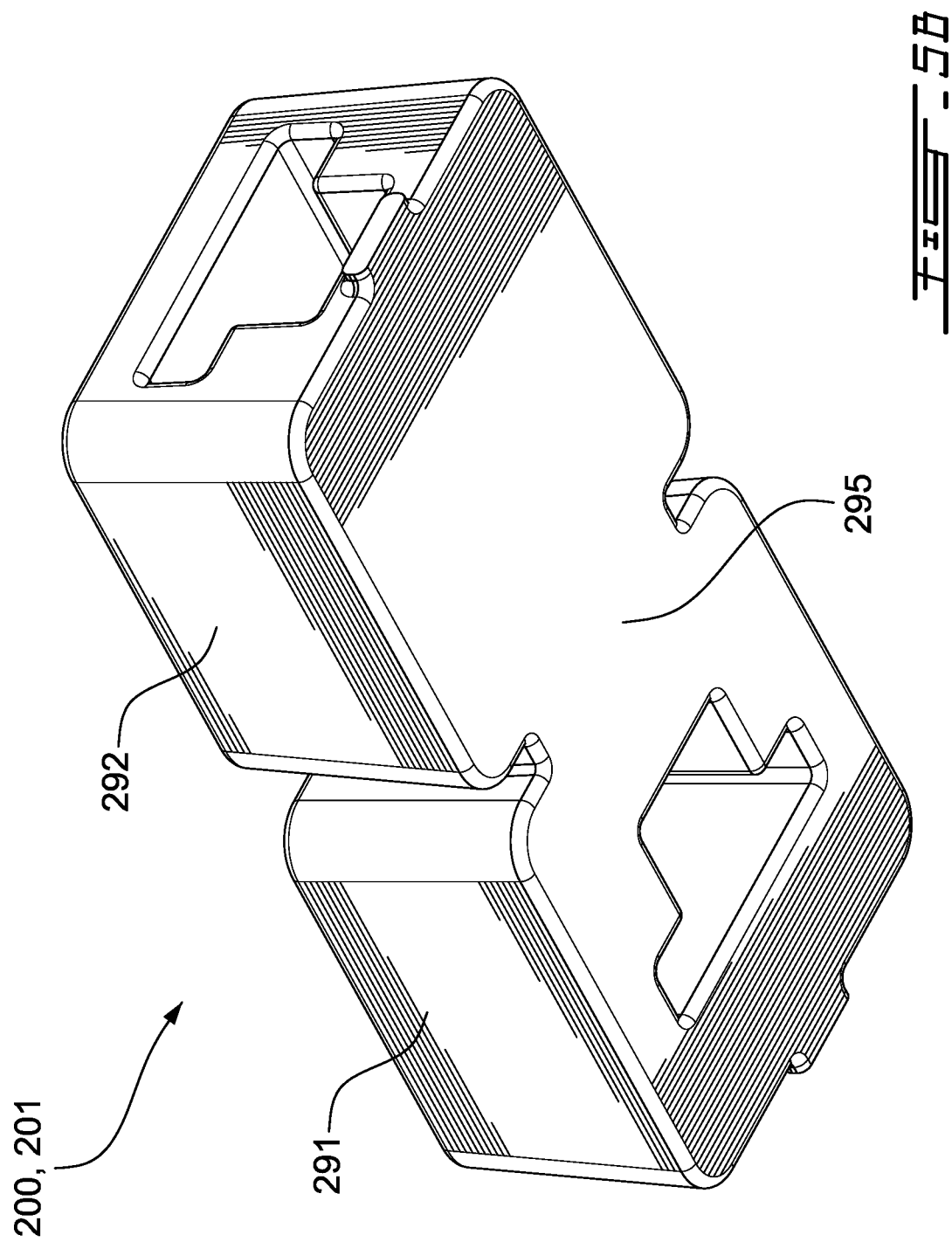

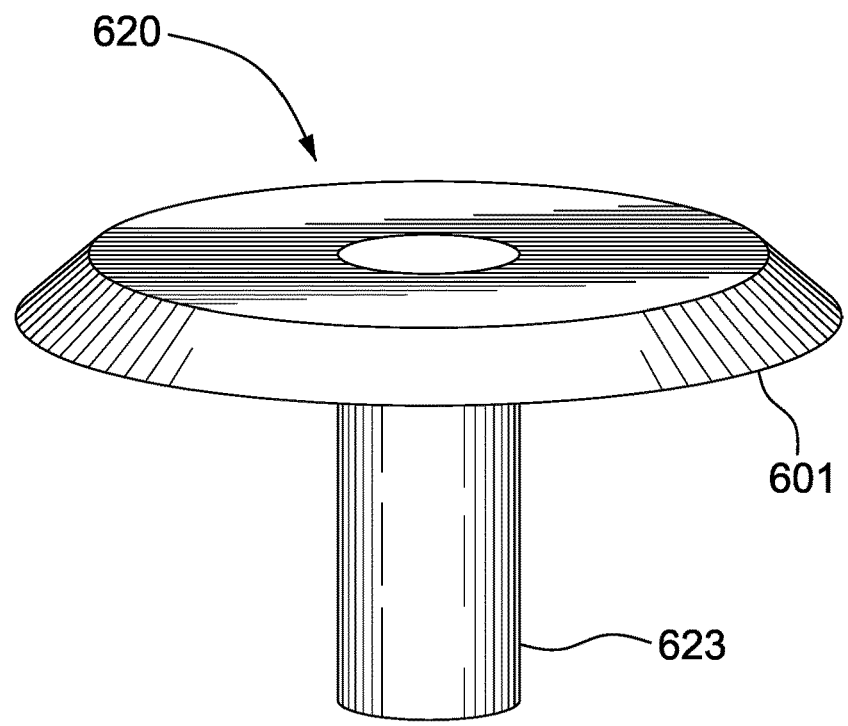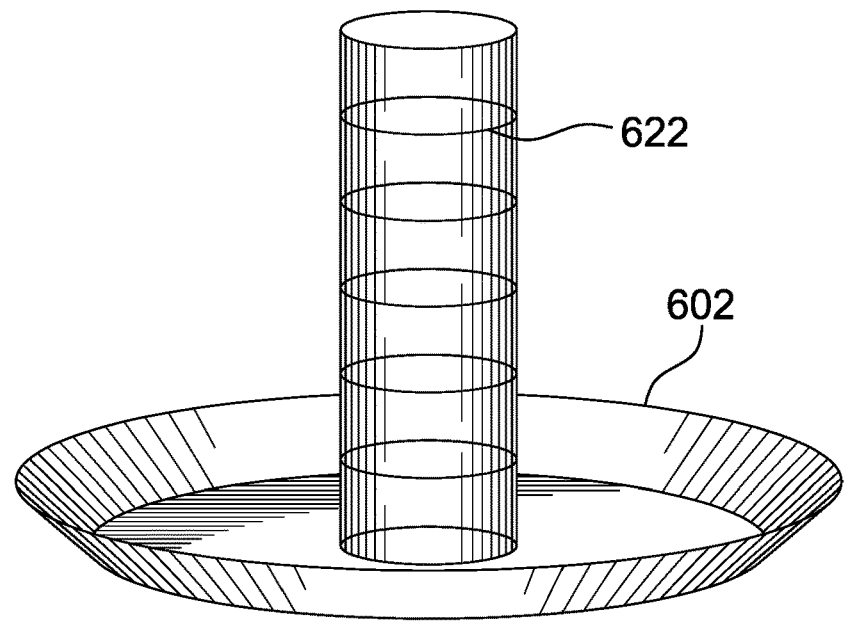
FIG. 10B

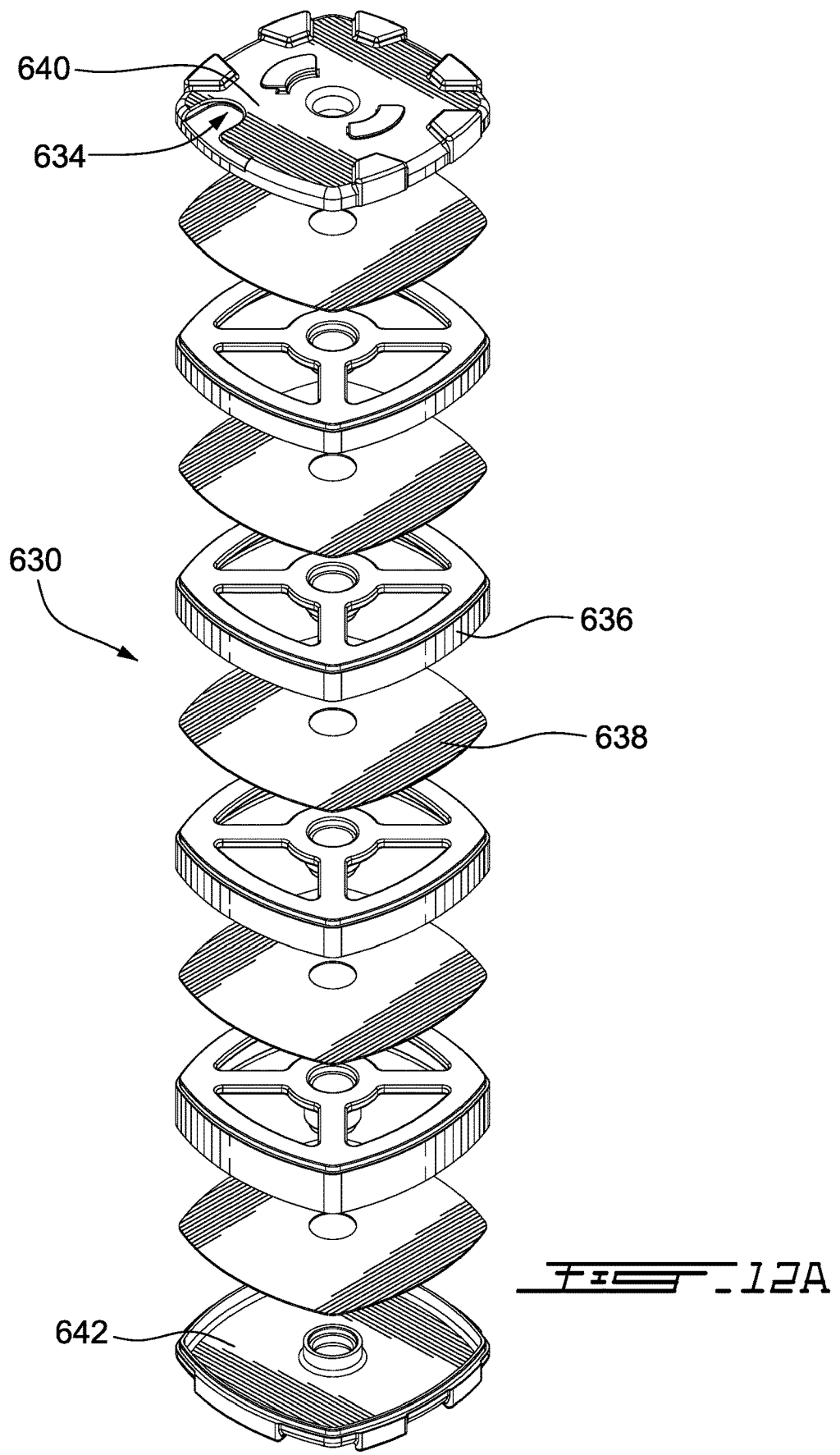

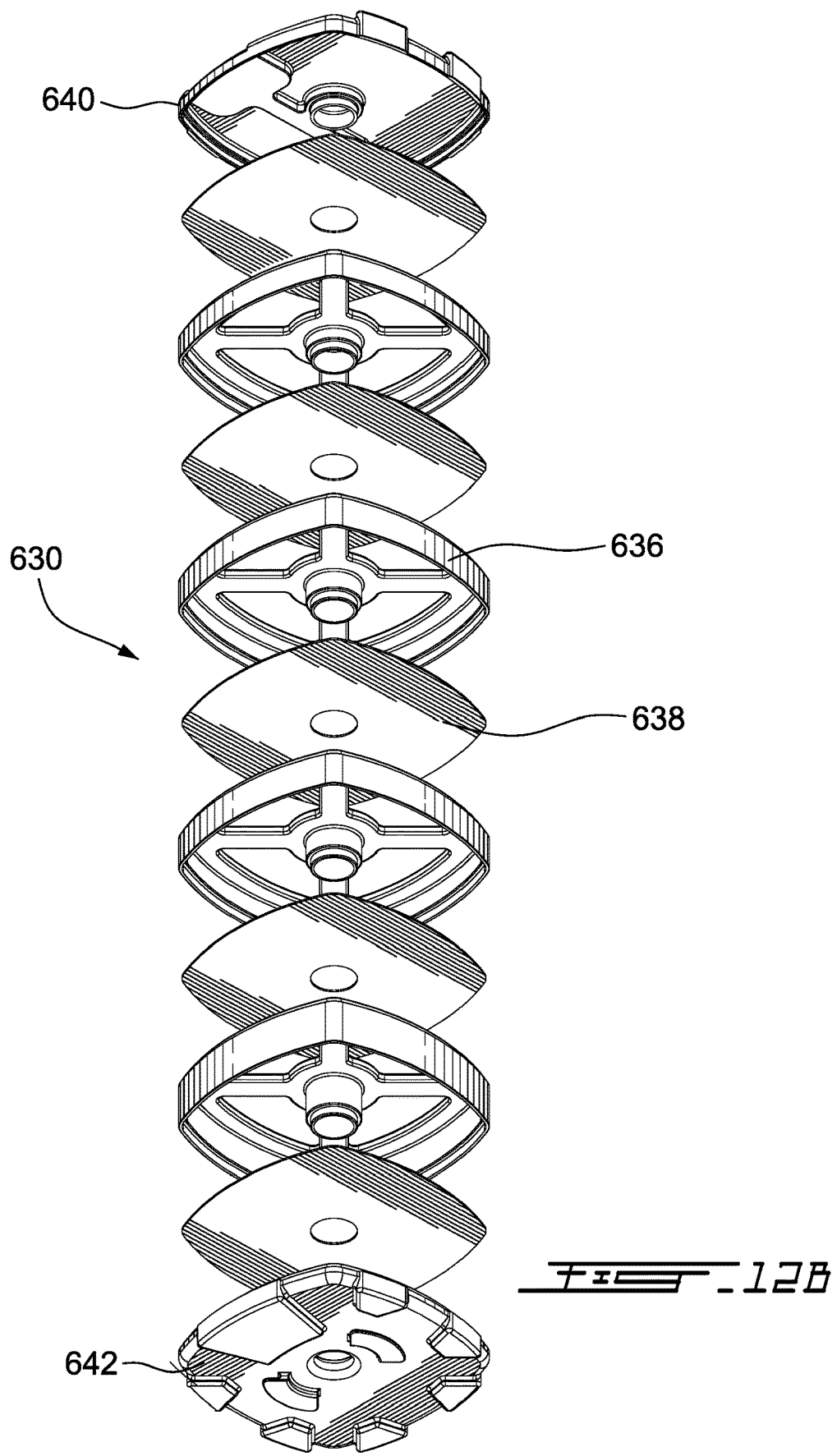

TIE WRAP CONNECTOR AND STRAP KIT

CROSS-REFERENCE TO RELATED APPLICATION

This application claims priority from U.S. patent provisional application 62/256,430 filed Nov. 17, 2015, and is a continuation of U.S. patent application Ser. No. 15/774,115 having a filing date of Nov. 16, 2016, the specifications of which are hereby incorporated herein by reference in their entirety.

BACKGROUND

(a) Field

The subject matter disclosed generally relates to tie wraps. More specifically, it relates to tie wraps having a strap distinct and separate from the connector.

(b) Related Prior Art

Nowadays, different types of tie wraps, also known as tie straps or cable ties, are used for various purposes. Originally used to attach wire harnesses, they are now used for attaching various objects and are a common piece of hardware found in the everyday life. A tie wrap usually comprises a strap (or cable) and a connector for retaining the strap, thereby confining the strapped objects in the strap.

However, most of the conventional tie wraps involve issues related to the length of the strap used in the tie wrap. More specifically, many of the conventional tie wraps have a strap pre-attached to the connector, in which the strap has a pre-defined length. This pre-defined length may be too short for some uses, and too long for other uses. If the length is too short, tie wraps with longer straps need to be bought. When the strap is too long, the remainder or exceeding portion needs to be cut, or otherwise it remains attached to the tie wrap and becomes bothering for the user. It causes undesirable waste or irritation.

Other tie wraps use a longer strap that is deliberately too long and therefore designed to be cut to the desired length. However, there is an exceeding portion that needs to be cut or bothers the user if it is not cut, the exceeding portion being usually simply discarded. The same kind of irritation for the user and unnecessary waste production occurs with this type of tie wrap too.

There is thus a need for tie wraps that can allow the user to choose an arbitrary and exact length of strap that is needed, while avoiding wasting exceeding strap portions, for example by enabling a reuse of the exceeding strap portions for another tie wrap.

SUMMARY

According to an embodiment, there is disclosed a connector to be used with a strap for wrapping an object, the strap being detached from the connector and having a first extremity and a second extremity, the connector comprising: a first passage adapted to insert and to lock the first extremity of the strap therein; a second passage having an entrance adapted to insert the second extremity of the strap therein and to prevent the strap from travelling toward the entrance upon insertion in the second passage; a body having a first section and a second section, wherein the first section comprises the first passage and the second section comprises the second passage, further wherein the first section comprises a vertical wall and the second section comprises a vertical wall distinct from and facing the vertical wall of the first section; and a bridge joining the first section and the second section of the body by extending between the vertical wall of the first section and the vertical wall of the second section.

According to an aspect, each of the first passage and the second passage has a blade, namely a first blade and a second blade, which are oriented such that the strap is able to travel only in one direction in the first passage and the second passage; and wherein upon pulling the strap in a direction opposite the one direction, the blade will wedge the strap in place in a respective one of the first passage and the second passage.

According to an aspect, the body is made of a first material and the first blade and the second blade are made from a second material different from the first material.

According to an aspect, the first material is a moldable material.

According to an aspect, the second material is one of a metal and a metallic alloy.

According to an aspect, the strap comprises a surface, and wherein the first blade and the second blade each comprise an edge capable of generating an incision on the surface of the strap and thereby wedge the strap in place in a respective one of the first passage and the second passage.

According to an aspect, the first passage and the second passage are substantially straight and not parallel to each other.

According to an aspect, the first passage and the second passage are substantially straight and substantially perpendicular to each other.

According to an aspect, the connector comprises a tearable attachment releasably attaching the connector to a neighbor connector in a connector chain, wherein the tearable attachment is tearable by a user to release the connector from the connector chain.

According to an embodiment, there is disclosed a connector to be used with a strap for wrapping an object, the strap being detached from the connector and having a first extremity and a second extremity, wherein the strap comprises a surface and is made of a plastic material, the connector comprising: a first passage adapted to insert the first extremity of the strap therein; a second passage adapted to insert the second extremity of the strap therein; wherein each of the first passage and the second passage has a blade, namely a first blade and a second blade, which are oriented such that the strap is able to travel only in one direction in the first passage and the second passage; wherein the first passage and the second passage are substantially straight and not parallel to each other; wherein the first blade and the second blade each comprise an edge capable of generating an incision on the surface of the strap, hence in the plastic material, and thereby wedge the strap in place in a respective one of the first passage and the second passage; and wherein upon pulling the strap in a direction opposite the one direction, the blade will wedge the strap in place in a respective one of the first passage and the second passage.

According to an aspect, the connector further comprises: a body having a first section and a second section, wherein the first section comprises the first passage and the second section comprises the second passage, further wherein the first section comprises a vertical wall and the second section comprises a vertical wall distinct from and facing the vertical wall of the first section; and a bridge joining the first section and the second section of the body by extending between the vertical wall of the first section and the vertical wall of the second section.

According to an aspect, the body is made of a first material and the first blade and the second blade are made from a second material different from the first material.

According to an aspect, the first material is a moldable material.

According to an aspect, the second material is one of a metal and a metallic alloy.

According to an aspect, the connector comprises a tearable attachment releasably attaching the connector to a neighbor connector in a connector chain, wherein the tearable attachment is tearable by a user to release the connector from the connector chain.

BRIEF DESCRIPTION OF THE DRAWINGS

Further features and advantages of the present disclosure will become apparent from the following detailed description, taken in combination with the append drawings, in which:

FIG. 5A is a perspective top view of a connector in accordance with an embodiment;

FIG. 5B is a perspective bottom view of a connector in accordance with an embodiment;

FIGS. 10A-10b are perspective views of embodiments of distributor holders;

FIGS. 11A-11B and 12A-12B are perspective views and perspective exploded views of a distributor holder in accordance with an embodiment.

It will be noted that throughout the append drawings, like features are identified by like reference numerals.

DETAILED DESCRIPTION

In embodiments there is disclosed a tie wrap comprising a strap and a connector which are separate and distinct, wherein the strap can be cut at an arbitrary length as desired by the user and used in combination with the connector while avoiding non-reusable exceeding portions of the strap.

The tie wrap is for the same uses as conventional tie wraps. As for conventional tie wraps, there is provided a strap for strapping one or more objects, and a connector for holding together both extremities of the strap.

Figure 1:
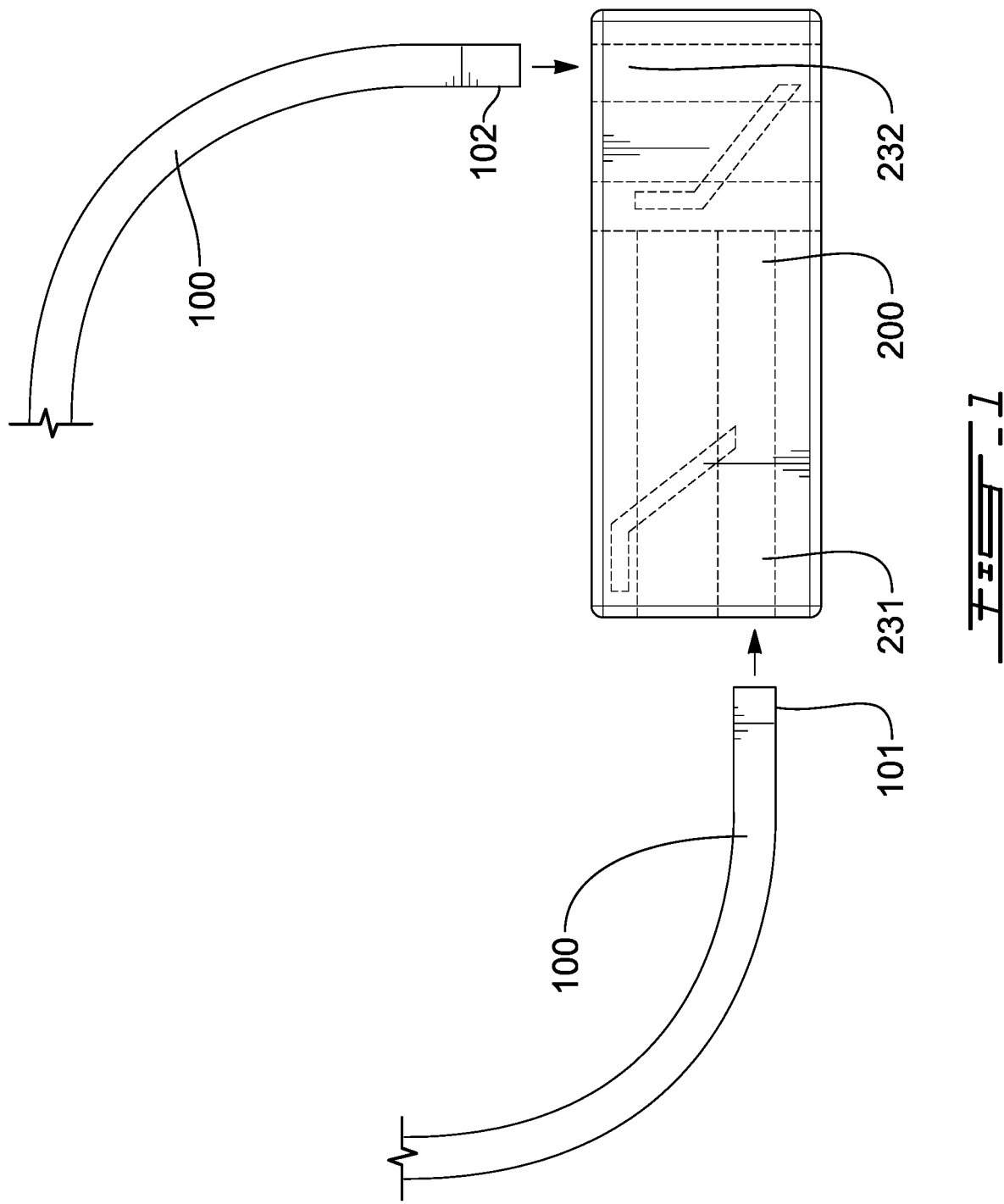
FIG. 1 is a cross-section view illustrating a strap and a connector forming a tie wrap, according to an embodiment.

Referring now to the drawings, and more particularly to FIG. 1, there is shown a strap 100 and a connector 200.

The strap 100 is an elongated piece made of a flexible material, such as plastic. The strap, according to an embodiment, is a generally long and flat rectangular cross-shape piece. According to the embodiment shown on FIG. 1, the strap 100 has a smooth surface. According to other embodiment (not shown), the strap 100 may have a different cross-section shape (e.g. round) or a different surface condition (e.g. ribbed). The side of the strap 100 is also, while not necessary, smooth.

FIG. 1 illustrates the first extremity 101 and the second extremity 102 of the strap 100. The first extremity 101 is to be fitted through its entrance 211 (see FIG. 2) in a first passage, namely the closed-end passage 231 of the closed-end chamber 221 (see FIG. 4), and held therein. The second extremity 102 is to be fitted through its entrance 212 (see FIG. 2) in a second passage, namely the open-end passage 232 of the open-end chamber 222 (see FIG. 4), and held therein.

To hold one of the extremities (101, 102) inside one of the chambers (221, 222) of the connector 200, the extremities (101, 102), once inserted, are retained from exiting the chamber (221, 222) (i.e., retained from going back) by a locking blade (251, 252, see FIG. 2) that pushed the strap 100 toward an opposed abutment wall (261, 262, see FIG. 2) and that bites into the strap 100 when an extremity (101, 102) of the strap 100 is pulled toward the entrance (211, 212). More precisely, the cooperation of the materials of which the strap 100 and blades (251, 252) are made are selected to enable an edge (255, 256, see FIG. 4), i.e. a cutting edge, of the blades (251, 252) to retain the strap 100 without possible slipping, e.g. to generate an incision at the surface of the strap 100 to retain the strap 100 when the strap 100 is being tentatively pulled out from the chamber (221, 222) from its entrance (211, 212), thereby preventing the release of the first extremity (101) or the second extremity (102) of the strap 100 from their respective chamber (221, 222).

Figure 4:
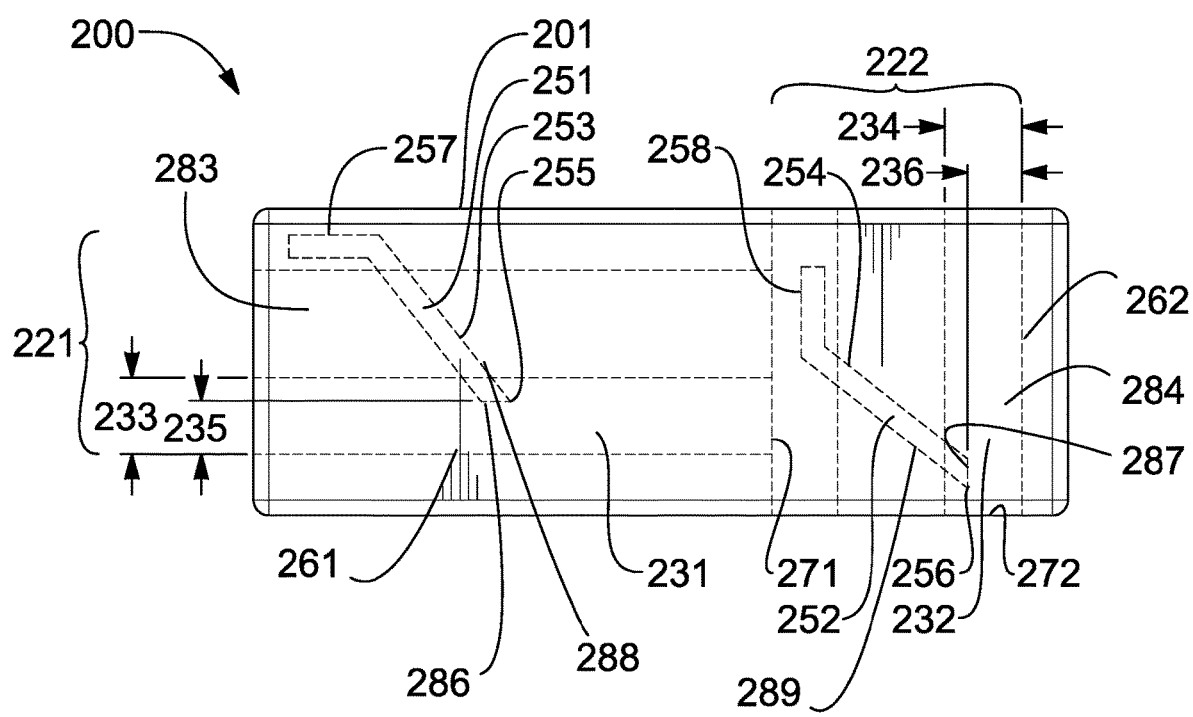
FIG. 4 is a side cross-section view of the connector of the tie wrap, according to an embodiment.

However, as mentioned above, the second passage 232 is open-end, defining a connection between its entrance 212 and its exit 272 (see FIG. 4). The exit 272 therefore provides an opening for letting the second extremity 102 of the strap 100 exit out of the connector 200 therethrough. It allows the user to pull the second extremity 102 of the strap 100 out of the chamber 222 through the opening at the exit 272 (in this desirable direction only). By pulling the strap 100, the user is able to bring the strapping portion of the strap 100 to its minimal length for strapping objects in the loop of strap 100. If the user pulls the strap 100 with enough strength, there is generated a stress (tension) in the material of the strap 100 to more effectively hold objects in the loop of the strap 100 (i.e., the strap 100 is tightened).

Through this process, there is created an exceeding length of strap 100 outside of the open-end chamber 222 past the open-end passage 232. The user may measure the length of strap 100 needed and cut a length of strap 100 slightly exceeding the necessary length. Alternatively, if the user wants to reuse the exceeding length of strap, they may choose an initial length of strap 100 that is very long. The exceeding portion of strap 100 can therefore be long enough to be used for a new tie wrap, and so on for a plurality of tie wraps until the exceeding portion of strap 100 is too short to be reused. This repeated reuse ensures that there is very little waste produced. As described further below, the availability of very long straps 100 is provided by the use of strap rolls 350.

Figure 2:
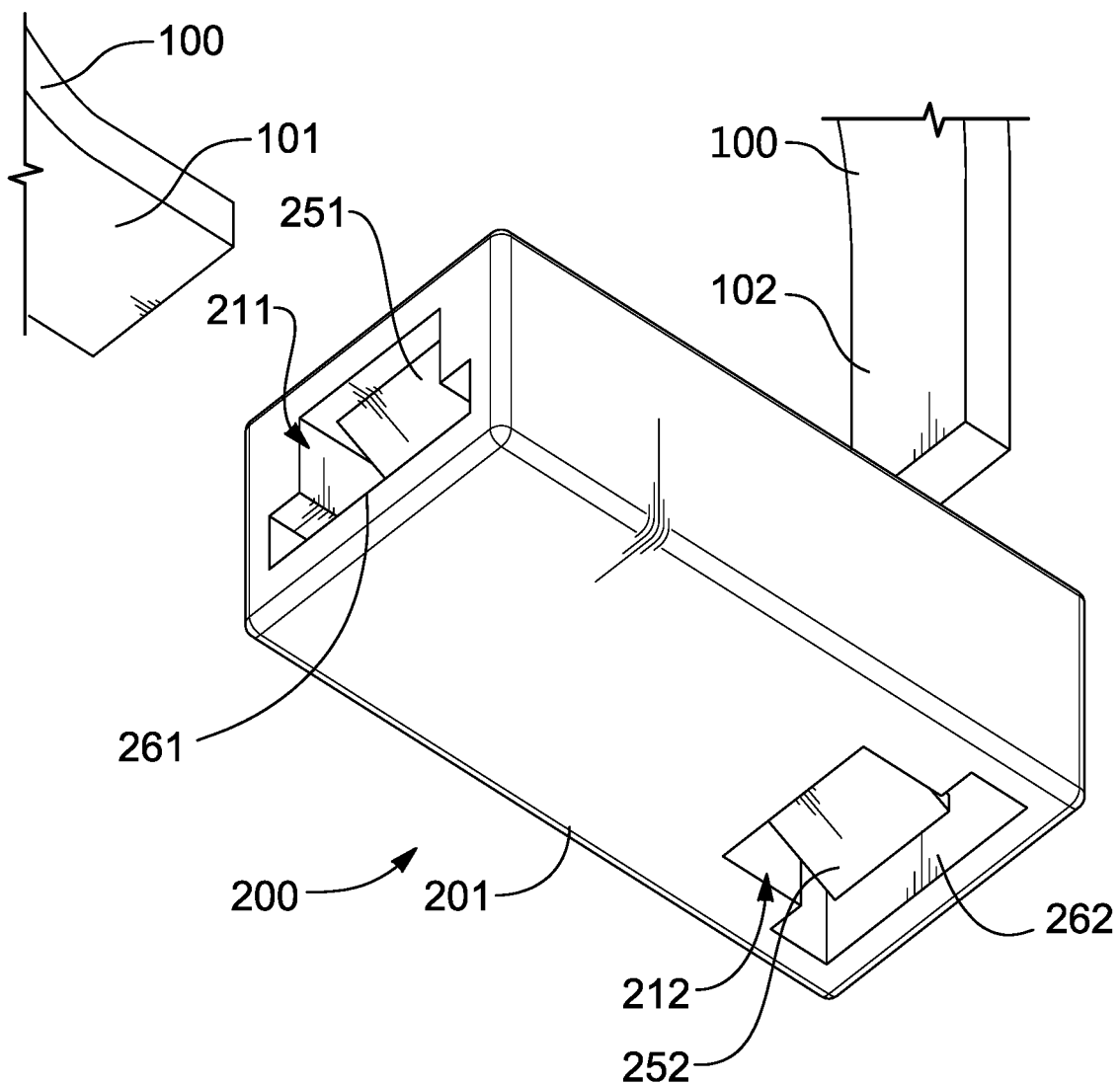
FIG. 2 is a perspective view of the connector of the tie wrap, according to an embodiment.
Figure 3:
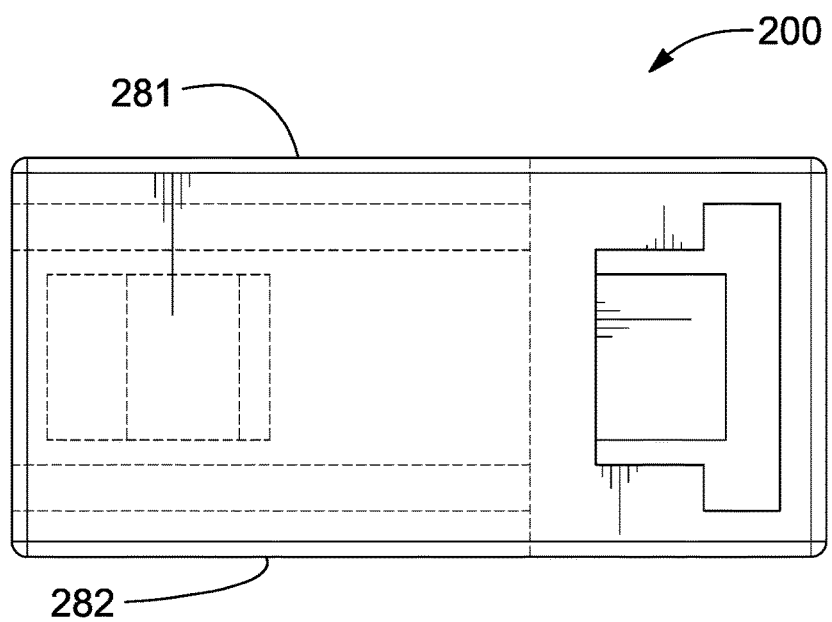
FIG. 3 is a top cross-section view of the connector of the tie wrap, according to an embodiment.

FIGS. 2 and 3 are a perspective and a top view of an embodiment of the connector 200. The connector comprises a body 201 which is made of a solid material, usually in plastic because economic to produce since it can be molded easily.

As mentioned above, the connector comprises a first chamber 221 and a second chamber 222, which are the hollow portions of the connector 200 designated to receive the first extremity 101 and the second extremity 102. Each one of the chambers (221, 222) is made substantially the same way, let alone that the first chamber 221 has a closed-end passage 231 and the second chamber 222 has an open-end passage.

Each one of the chambers (221, 222) comprises an entrance (211, 212), which is an aperture provided at the surface of the connector for inserting an extremity of the strap therethrough. Each chamber defines a passage (231, 232) having a longitudinal axis along which the strap 100 is inserted. For explanation purpose, the connector 200 and the first passage 231 have parallel longitudinal axes.

Each of the passages has a width (233, 234) allowing the strap 100 to be inserted therein. For insertion, the width (233, 234) of the passage (231, 232) must be slightly larger than the width of the extremities (101, 102) of the strap 100.

Each of the passages comprises an abutment wall (261, 262) opposed to the location of the blades (251, 252) along which the extremities (101, 102) travel.

Inside each one of the chambers (221, 222), each one of the passages (231, 232) houses a blade (251, 252). The locking blade 251 (aka, the first blade) is for retaining the strap 100 upon the insertion of the first extremity 101 of the strap 100, as mentioned above. The locking blade 252 (aka, the second blade) is for preventing the strap 100 upon the insertion of the second extremity 101 of the strap 100 to travel towards its entrance 212, as mentioned above.

The blades (251, 252) extends inside the passages (231, 232), toward their abutment wall (261, 262), thereby defining a remaining width (235, 236) shown on FIG. 4. The remaining width (235, 236) is the width between the edge (255, 256) of the blade (251, 252) and the abutment wall (261, 262) of the passage (231, 232).

The blade (251, 252) provided in the chamber (221, 222) has a sloped orientation away from their respective entrance (211, 212), therefore comprising components both parallel and perpendicular to the longitudinal axis of the passage (231, 232). More specifically, the blade extends inwardly inside the passage (the component perpendicular to the longitudinal axis), from the body 201 of the connector 200. The blade 251 also extends at the same time away from the entrances (211, 212), thus towards the bottom end 271 of the closed-end passage 231 (the component parallel to the longitudinal axis) and the exit 272 of the open-end passage 232. Therefore, both blades (251, 252) are oriented inwardly into their respective passage and also oriented in the direction opposite the entrance of each passage (231, 232). The blades (251,252) are further biased toward their respective abutment wall (261, 262). When they are moved away from their corresponding abutment wall (261, 262) by the strap 100, they press against the strap 100 to move back close to their respective abutment wall (261, 262), thereby ensuring that the edges (255, 256) bit in the strap 100 when a movement of the strap 100 toward the entrance (211, 212) happens.

It is worth mentioning that the edges (255, 256) are defined by a first surface (288, 289) of the inclined portion (253, 254) opposed to the entrance (211, 212) of the corresponding passage (231, 232) and a second surface (286, 287) substantially facing the abutment wall (261, 262) of the corresponding passage (231, 232). The edges (255, 256), with the second surface (286, 287) configured to be substantially parallel to the corresponding abutment wall (261, 262), have an acute angle edge capable of performing an incision on the surface of the strap 100. According to an embodiment, the angle between the surfaces (288, 289) and (286, 287) is about 90 degrees. According to an embodiment, the angle between the surfaces (288, 289) and (286, 287) is between 30 degrees and 60 degrees.

According to an embodiment, the blade (251, 252) comprises an inclined portion (253, 254) which has the necessary orientation, and a blade base (257, 258), which is the portion of the blade (251, 252) that is held by the body 201 of the connector 200. The blade base (257, 258) and the inclined portion (253, 254) usually form an integral piece, namely the blade (251, 252), although they can also be separate parts held together either by a fastener or by soldering. The inclined portion (253, 254) ends with the edge (255, 256).

The blades (251, 252) and the body 201 can form an integral piece if they are made of the same material or of materials that can be joined (for plastics) or soldered (for metals) together. However, more efficient embodiments use a blade (251, 252) made of a metal (to ensure solidity and efficiency of the edge). Economic manufacturing processes emphases on the manufacturing of the body 201 from moldable material (usually plastic). Therefore, the most efficient while economic embodiments comprise blades (251, 252) which are distinct and separate from the body 201 and that need to be either attached to the body 201 during fabrication (for example, the blade base (257, 258) is held in the molded plastic of the body 201), or held into the mold during the molding of the body 201.

The open-end passage 232 can be considered as having an entrance by which the strap 100 enters and an exit 272 by which the strap 100 exits of the open-end passage 232. The strap 100 can be inserted by the entrance through the open-end passage and can exit by the exit where it can be pulled by the user to tighten the loop of the strap 100 to hold objects. The strap 100 can exit by this exit only, and cannot be pulled out of the chamber by the entrance.

According to an embodiment, the longitudinal axis of the first passage 231 is substantially perpendicular to the longitudinal axis of the second passage 232, as shown on FIGS. 1-4. According to an embodiment, a projection of the first passage 231 along the longitudinal axis of the first passage 231 crosses the path of the second passage 232. Now referring to FIGS. 5A and 5B, embodiments of the connector 200 are illustrated comprising a body 201 comprising a first section 291 and a second section 292 with a bridge 295 extending therebetween. In one embodiment, the strap 100 is wedged in the passage towards the top of the connector 200, while in the other embodiment, the strap 100 is wedged in the passage toward the bottom of the connector 200.

Figure 6A:
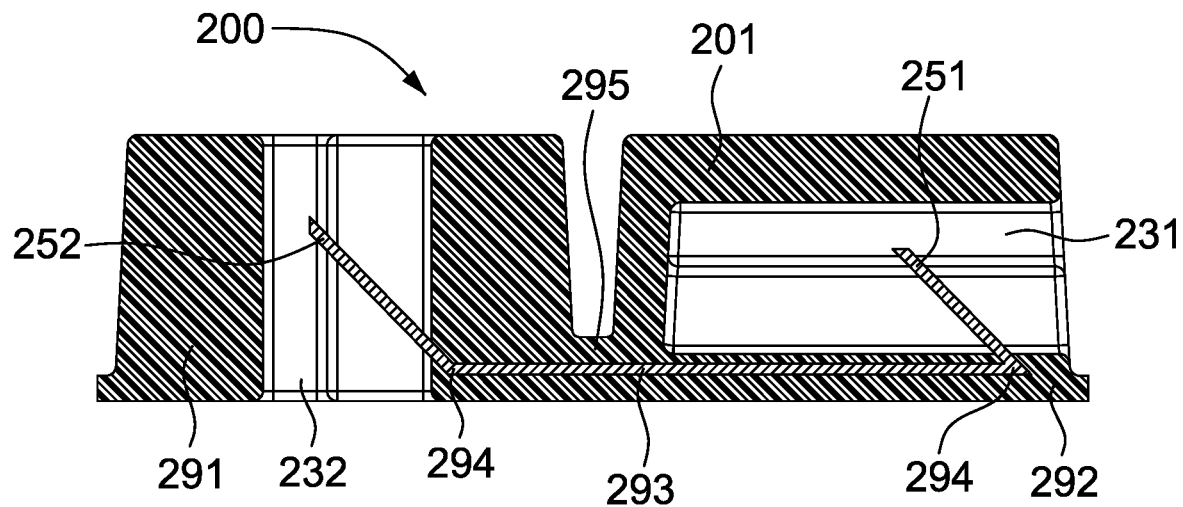
FIG. 6A is a side cross-section view of the connector of the tie wrap providing an exterior aspect similar as one illustrated on FIGS. 5A-5B, according to an embodiment.

FIG. 6A provides a cross-section view of an embodiment that has a body 201 comprising a first section 291 and a second section 292 with a bridge 295 therebetween as illustrated on FIGS. 5A-5B. The close-end passage 231 extends in the first section 291 of the body 201 along a longitudinal axis parallel to the general longitudinal axis of the body 201. The open-end passage 232 extends and passes through the second section 292 of the body 201. The open-end passage 232 has an orientation substantially perpendicular to the longitudinal axis, provided free access to the entrance 212 and the exit 272 of the open-end passage 232.

The blades (251, 252), acting in the close-end passage 231 and the open-end passage 232, comprises a blade body 293 and form together a single blade of material connecting the two sections (291, 292) of the body 201 with plastic molded around. The single blade embodiment provided a strong bridge 295 linking the first section 291 and the second section 292 of the body 201. The single blade comprises a series of folds 294 shaping the single blade in the desired shape into the connector 200 and providing the blades (251, 252) of efficient orientations in the passages (231, 232).

Figure 6B:
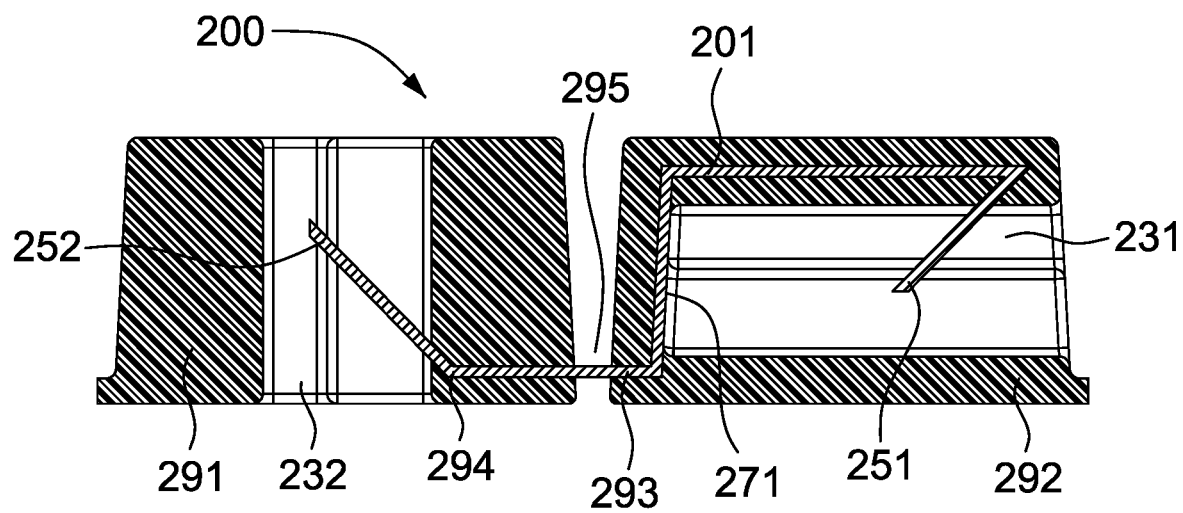
FIG. 6B is a side cross-section view of the connector of the tie wrap providing an exterior aspect similar as one illustrated on FIGS. 5A-5B, according to another embodiment.

Now referring to FIG. 6B, another embodiment shows the body 201 comprising two sections as to the one described in relation with FIGS. 5A-5B. As with the embodiment of FIG. 6A, the blades (251, 252) acting in the close-end passage 231 and the open-end passage 232 form a single blade of material connecting the two sections (291, 292) of the body 201 with plastic molded around. The single blade is folded according to an alternative pattern to both reinforce the bottom end 271 of the close-end passage 231 and to link the two sections (291, 292) of the body 201.

According to embodiments, the single blade is folded along a single plane, therefore preventing wears from excessive deformation of the blade.

As illustrated, the bridge 295 may be constituted of molding material (FIG. 6C), of a blade enclosed in molded material (FIG. 6A) or of solely the blade constituting alone the bridge 295 joining the two sections (291, 292).

Figure 6C:
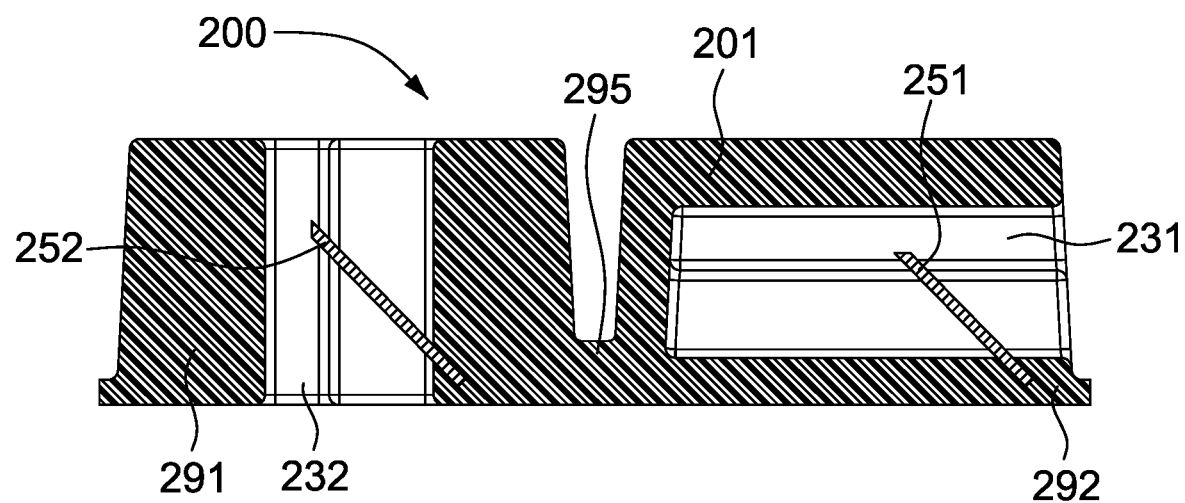
FIG. 6C is a side cross-section view of the connector of the tie wrap providing an exterior aspect similar as one illustrated on FIGS. 5A-5B, according to another embodiment.

Now referring to FIG. 6C, another embodiment shows the body 201 linked by a bridge 295 molded of the same material and concurrently to the connector 200. Dimensions and material for the bridge 295 are selected to prevent premature wear of the bridge 295. Furthermore, material may be selected to allow deformation with a predetermined level and some level of resilience adapted for particular usages.

According to embodiments, the blade or blades (251, 252) are made of plastic, of metal, of a metallic alloy, or specifically of stainless steel for use in condition where corrosion problems may arise. According to embodiments, the single blade, when made of metal or metallic alloy, may be molded in a specific shape and folded in another shape after the molding process to improve quality of the molding of the body 201 and the body components.

Accordingly, the body 201 of the connector 200 may consist in a single component, or a plurality of linked sections with the bridge 295 linking the components having the strength necessary to hold the body 201 as a single piece once tension applied to the strap 100.

According to embodiments, the passages (231, 232) comprise a clearance section (283, 284) allowing movement of the blade (251, 252) away from the abutment wall (262, 262) upon insertion of an extremity (101, 102) of the strap 100. Accordingly, the clearance section (283, 284) allows the blade (251, 252) to changes temporarily its orientation slightly more away from the entrance (211, 212).

According to embodiments, the cross-section shape of the strap 100, and therefore of the passages (231, 232), may consists in alternative shapes such as square, round and oblong. According to these embodiments, the passages (231, 232) respectively comprise an abutment wall (261, 262) of a shape offering a substantially matching abutment surface to the strap 100, with the blade (251, 252) being able to grip, bit and/or slightly incise the surface of the strap 100 to prevent the strap 100 from moving toward the entrances (211, 212).

As mentioned above, according to an embodiment the strap 100 comprises a smooth surface, instead of the teeth or holes present in alternative products. The smooth surface ensures that the tie wrap, once in a closed and locked position, has a length that is not dictated by the discrete positions of these teeth or holes. Instead, the range of possible lengths for the closed tie wrap is not discrete, but rather continuous, because of the smooth and continuous nature of the surface of the strap 100 that can be incised at any location thereon by the edge (255, 256) of the blade (251, 252). According to an embodiment, the strap 100 is continuous in that it does not have any aperture or holes therein used for locking the strap in place in the connector 200. In such an embodiment, the strap 100 is substantially uniform along its length.

Furthermore, as mentioned above, there are many conventional tie wraps in which one of the ends of the strap is already attached and fixed to the connector, and/or in which the strap is of a given length that cannot be extend. Contrarily to these conventional tie wraps, the present tie wrap allows a user to cut the desired length for the strap.

Figure 7:
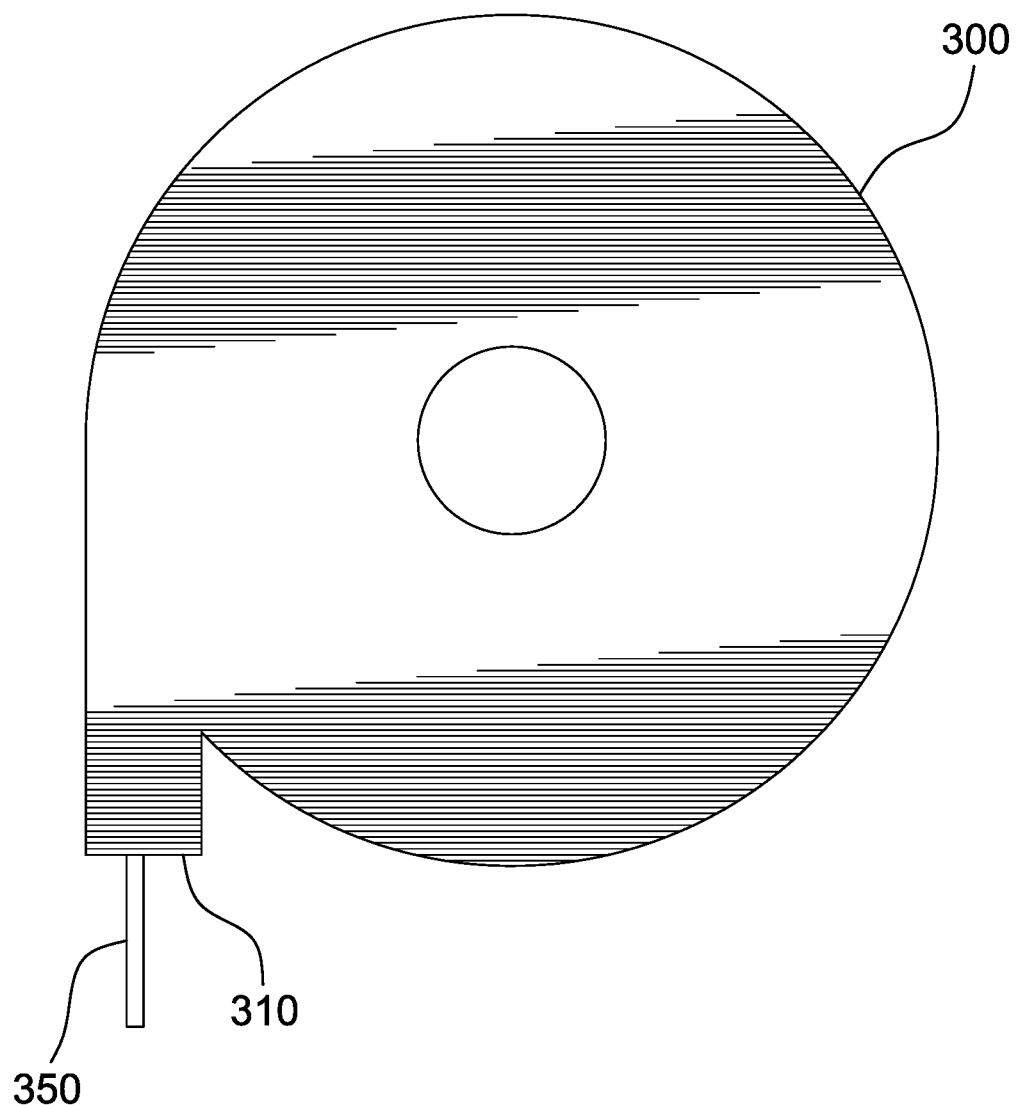
FIG. 7 is a side view of a strap distributor, according to an embodiment.

Indeed, since none of the extremities (101, 102) of the strap 100 is pre-attached to the connector 200, the strap 100 can be provided to the user in the form of a long strap roll 350, as shown on FIG. 7. The strap roll 350 can be progressively unrolled for exposing an arbitrary length of strap 100, cutting it, and using this cut portion in combination with the connector 200. According to an embodiment, the strap roll 350 is provided in a roll distributor 300. According to an embodiment, the roll distributor 300 comprises a distributor exit 310 for letting the strap 100 unroll therethrough. Other types of distributors can also exist with similar features, or with a different architecture.

Figure 8:
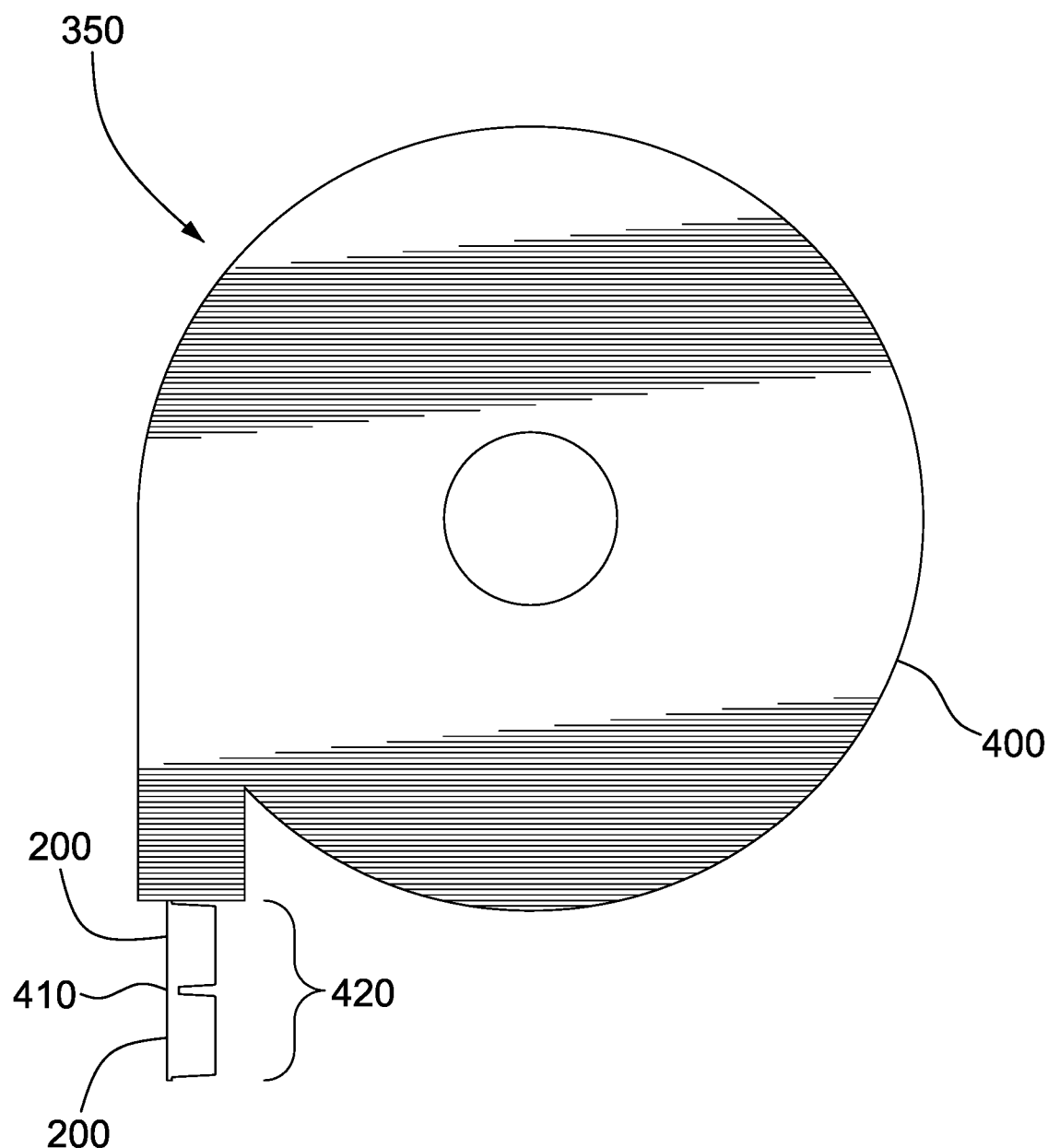
FIG. 8 is a side view of a connector distributor, according to an embodiment.

The same holds for the connector 200, as illustrated in FIG. 8. Since none of the extremities (101, 102) of the strap 100 is pre-attached to the connector 200, it means that the connector 200 can be provided to the user in a serialized fashion. Therefore, the connector 200, which has a body 201 preferably made of a moldable material (usually plastic), can have a tearable attachment 410, usually made of plastic too and part of the body, that links connectors 200 as a connector chain 420. The connector chain 420 can be packed as a roll and/or stocked in a connector distributor 400. When the user needs a connector 200, they progressively pull the connector chain 420 out of the connector distributor 400 and break or severe the tearable attachment 410 in order to separate the first connector 200 from the remaining connector chain 420. The ligatured connectors 200 forming a connector chain 420 can thus be broken apart to use them individually once the user tears the tearable attachment 410 therebetween.

According to embodiments, the tearable attachments 410 are located on the side walls (281, 282, see FIG. 3) of the connector 200. The tearable attachment 410 is joined to the side walls (281, 282) since the side walls (281, 282) are free of entrances (211, 212). According to an embodiment, the tearable attachment extends substantially over the length of the connector 200, defined along the longitudinal axis of the close-end passage 231.

According to embodiments, the opening for the distribution of the connectors 200 may be located on one side of the connector distributor 400.

Figure 9:
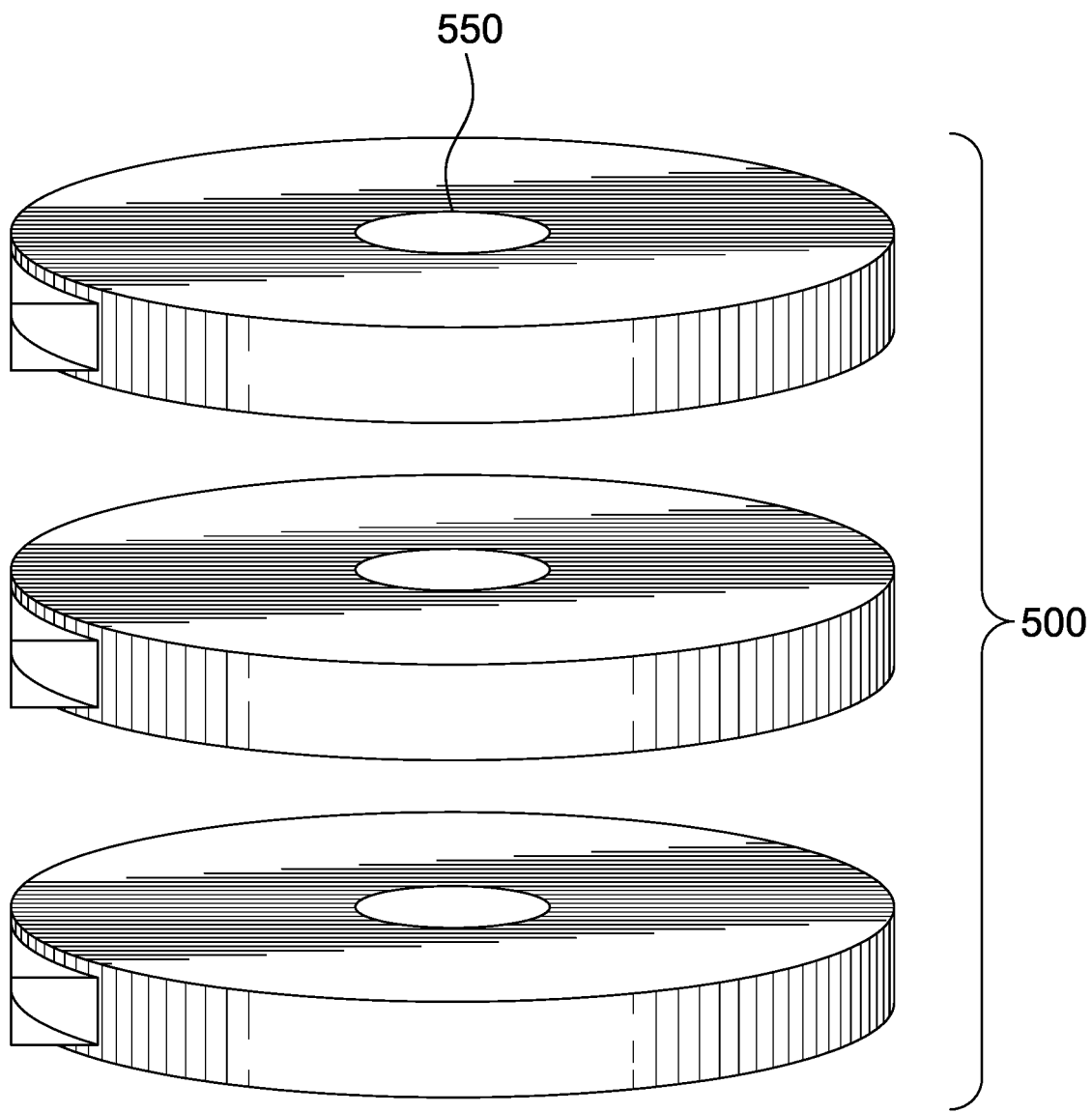
FIG. 9 is a perspective view of a pile of stacked distributors, according to an embodiment.

Now referring to FIG. 9, there is shown an embodiment of a plurality of connector distributors 400 and/or roll distributors 300. As shown in the figure, the distributors have a disc-like shape and comprise a central hole. The distributors can be stacked in a distributor pile 500.

According to an embodiment, the roll distributor 300 comprises a cutter (not shown) for cutting the strap 100 in a user-friendly manner. According to an embodiment, the cutter is provided at the distributor exit 310 and is permanently fixed thereto. According to an embodiment, the cutter comprises a press-button that can be pushed by the user to urge the blade of the cutter toward to strap 100 to cut it to get the desired length. According to an embodiment, a similar device is provided on the connector distributor 400.

Figure 10A:
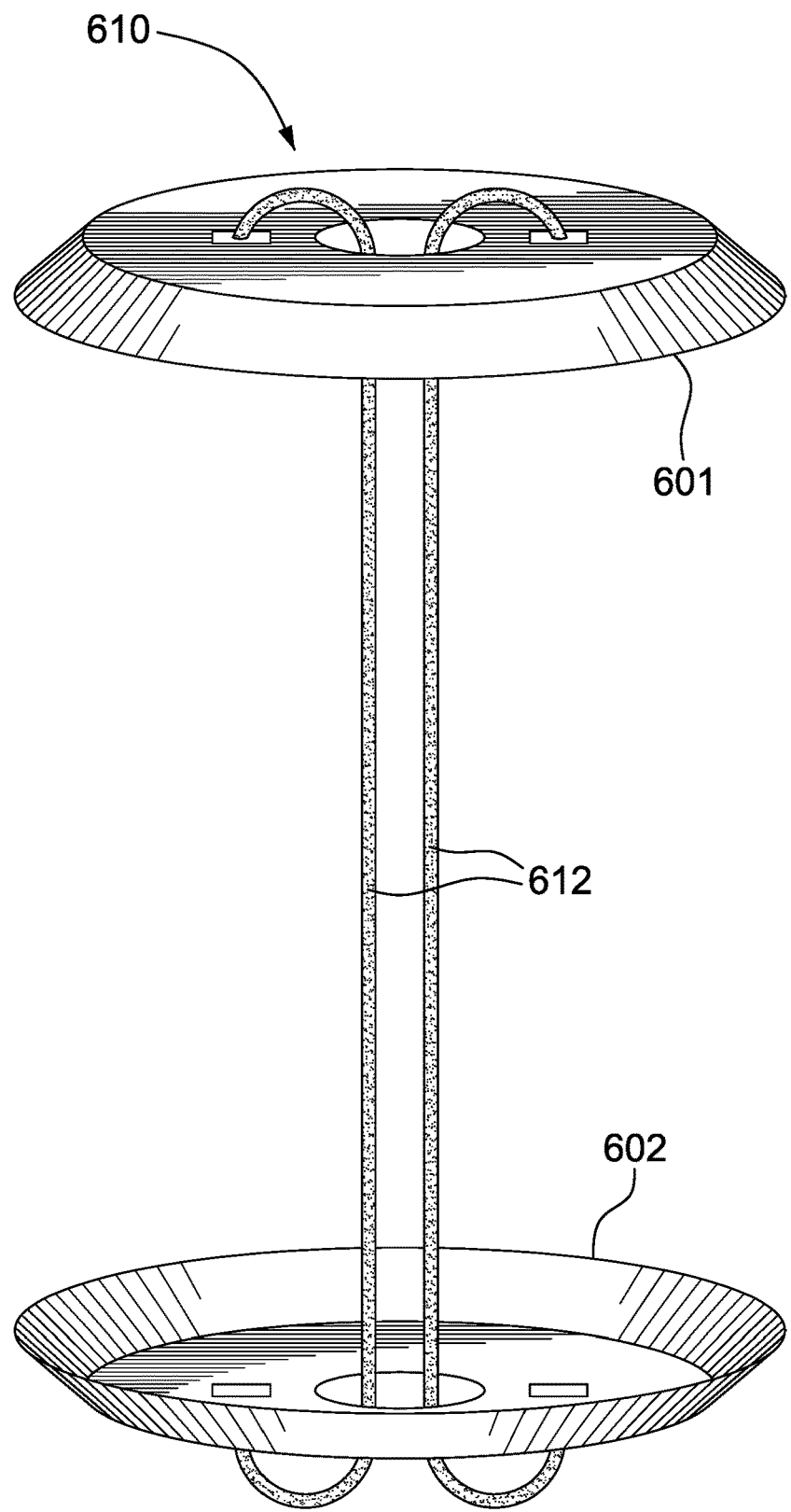
Figure 11A:
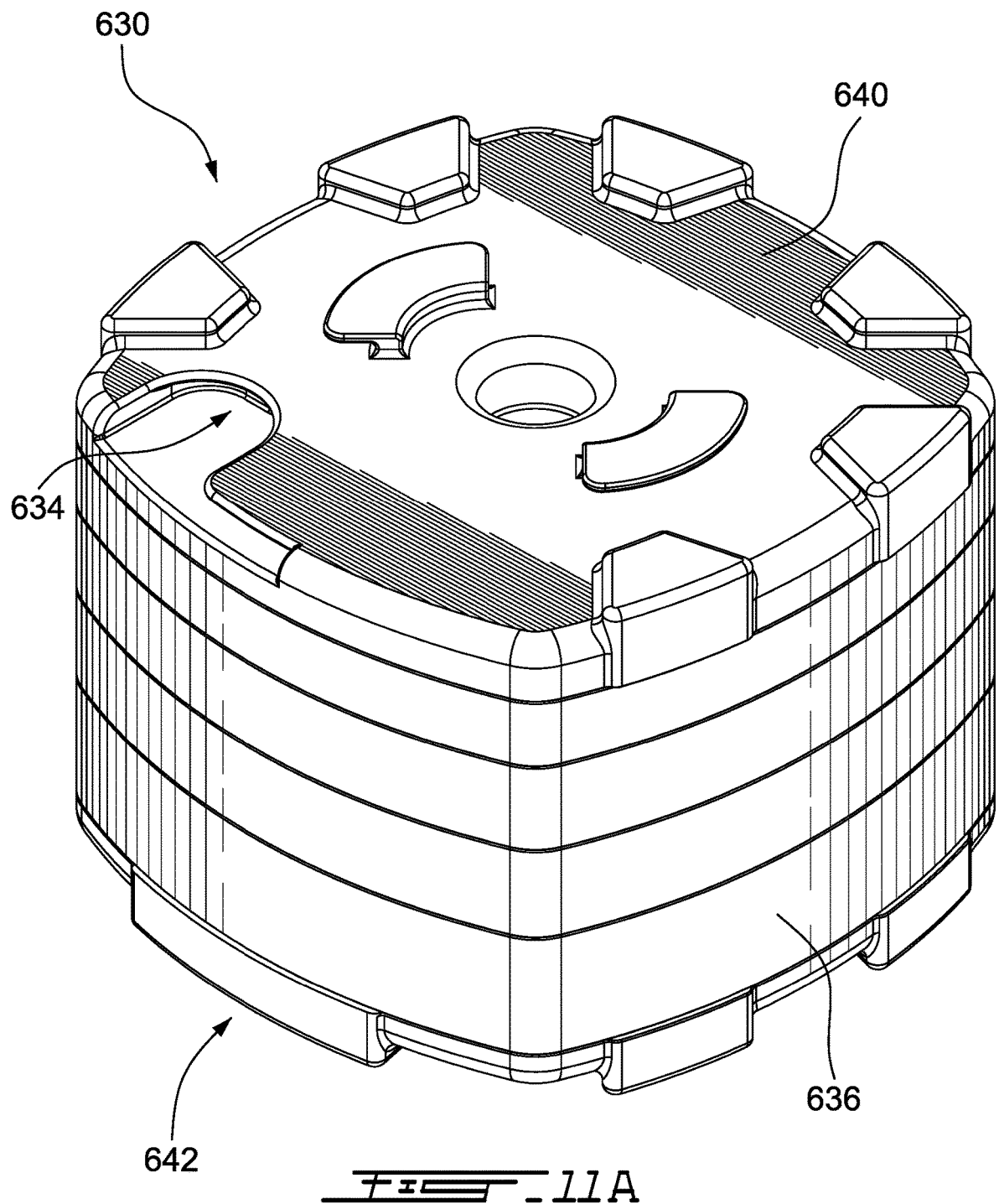
Figure 11B:
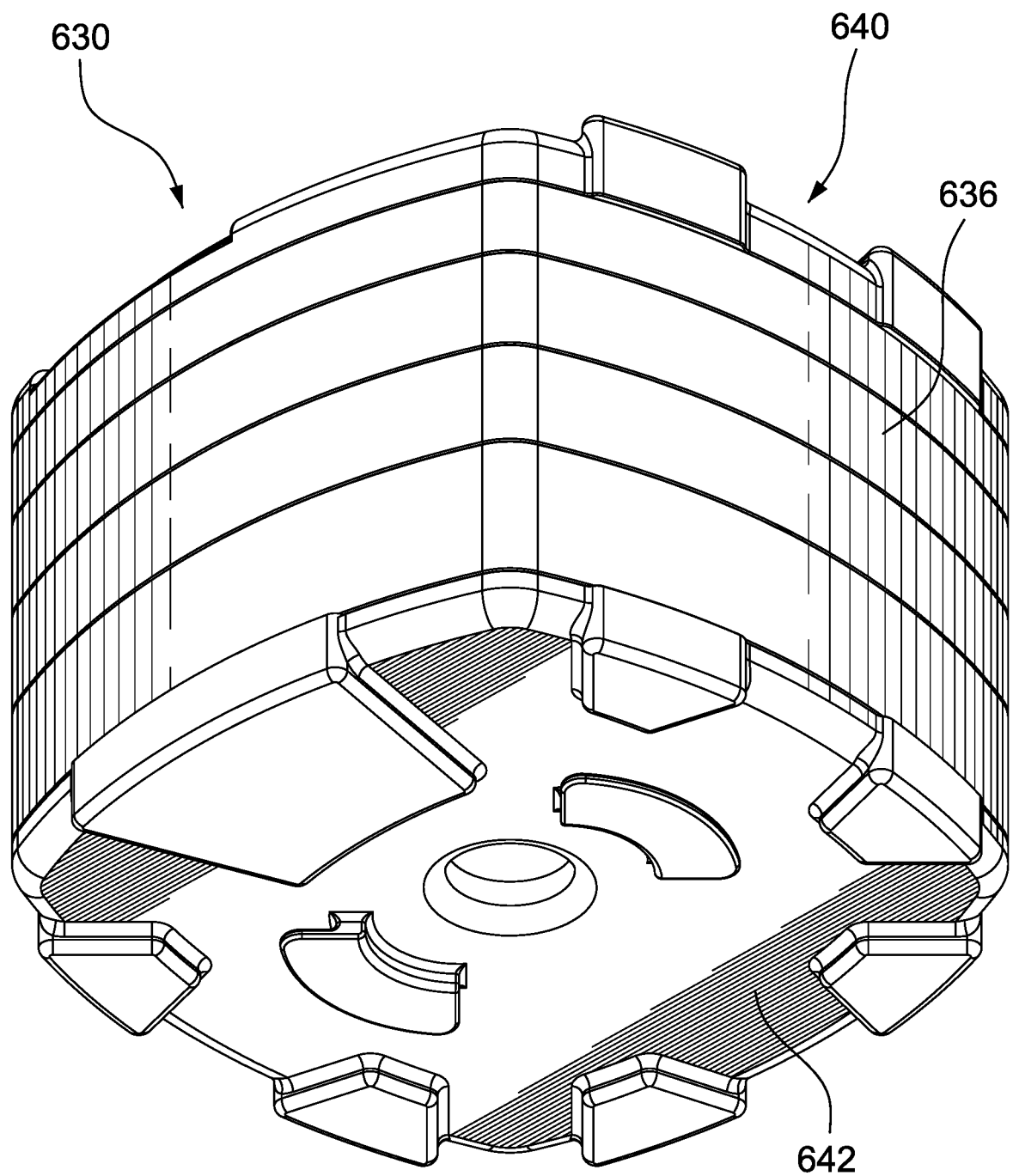

FIGS. 10A-10B show embodiments of distributor holders 610 and 620. In the illustrated embodiments, there are a first end 601 and a second end 602 of the distributor holder (610, 620).

The distributor holder 610 comprises one or more strings 612 that are attached to the first end 601 and to the second end 602. The strings can be elastic or not, depending on the embodiment.

The distributor holder 620 comprises a first threaded section 623, which is a tube having a thread therein, and a second threaded section 622, which is a tube having a thread on its surface, that are attached to the first end 601 and to the second end 602, respectively (although they can be interchangeable). The threads of each one of the threaded sections are adapted to fit with the other one (they can be screwed together).

When the strings 612 are detached or when the threaded sections (622, 223) are detached, the first and second ends (601, 602) of the distributor holder (610, 620) are separate. A distributor pile 500 of stacked distributors can then be provided. The strings 612 or one of the threaded sections (622, 623) are inserted in the central hole 550 of the distributors (300, 400) stacked in the distributor pile 500. The strings 612 are then attached, or the threaded sections (622, 623) are screwed together. The distributor holder (610, 620) thereby holds the distributor pile 500. The distributor holder (610, 620) can be transported by the user who can unroll the strap 100 from the strap roll 350, or detach a connector 200 from the connector chain 420.

According to embodiments (not shown), the distributor holder uses an alternative means to hold a variable number of roll distributors, such as using different inner threaded sections and outer threaded sections cooperating with each other and adapted to receive additional sections if more space is needed for a more voluminous roll stack. Another embodiment comprises releasable clip-enabled faces of roll distributors and distributor holder ends (601, 602) allowing to add up as much roll distributors as necessary.

Now referring to FIGS. 11A, 11B, 12A and 12B, the distributor holder 630 can hold a plurality of distributors side by side. According to embodiments, the exterior face of one or both of the ends 632 of the distributor holder 630 can hold and/or comprises components and shaped adapted to the use of the present tie wraps. Examples of such components comprise a clip to hold the distributor holder 630 on a pair of pants, a slot 634 to house a tool such as a cutter or a measuring tape, a slot to house a pencil, a case to house tags, etc.

The distributor holder 630 is conceived as a series of casings 636 adapted to hold a distributor. The casings 636 are stored side by side with a separating sheet 638 separating a casing 636 from a neighbor casing 636. A top piece 640 and a bottom piece 642 close the distributor holder 630 at its ends.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A connector to be used with a strap for wrapping an object, the strap being detached from the connector and having a first extremity and a second extremity, the connector comprising:
   a first passage adapted to insert and to lock the first extremity of the strap therein;
   a second passage having an entrance adapted to insert the second extremity of the strap therein and to prevent the strap from travelling toward the entrance upon insertion in the second passage;
   a body having a first section and a second section, wherein the first section comprises the first passage and the second section comprises the second passage, further wherein the first section comprises a vertical wall and the second section comprises a vertical wall distinct from and facing the vertical wall of the first section; and
   a bridge joining the first section and the second section of the body by extending between the vertical wall of the first section and the vertical wall of the second section,
   wherein each of the first passage and the second passage has a blade, namely a first blade and a second blade, which are oriented such that the strap is able to travel only in one direction in the first passage and the second passage; and wherein upon pulling the strap in a direction opposite the one direction, the blade will wedge the strap in place in a respective one of the first passage and the second passage, and
   wherein each of the first passage and the second passage has a blade, namely a first blade and a second blade, which are oriented such that the strap is able to travel only in one direction in the first passage and the second passage; and wherein upon pulling the strap in a direction opposite the one direction, the blade will wedge the strap in place in a respective one of the first passage and the second passage.

2. The connector of claim 1, wherein the first material is a moldable material.

3. The connector of claim 2, wherein the second material is one of a metal and a metallic alloy.

4. The connector of claim 1, wherein the strap comprises a surface, and wherein the first blade and the second blade each comprise an edge capable of generating an incision on the surface of the strap and thereby wedge the strap in place in a respective one of the first passage and the second passage.

5. The connector of claim 1, wherein the first passage and the second passage are substantially straight and not parallel to each other.

6. The connector of claim 1, wherein the first passage and the second passage are substantially straight and substantially perpendicular to each other.

7. The connector of claim 1, wherein the connector comprises a tearable attachment releasably attaching the connector to a neighbor connector in a connector chain, wherein the tearable attachment is tearable by a user to release the connector from the connector chain.

8. A connector to be used with a strap for wrapping an object, the strap being detached from the connector and having a first extremity and a second extremity, wherein the strap comprises a surface and is made of a plastic material, the connector comprising:

a first passage adapted to insert the first extremity of the strap therein;
a second passage adapted to insert the second extremity of the strap therein;
wherein each of the first passage and the second passage has a blade, namely a first blade and a second blade, which are oriented such that the strap is able to travel only in one direction in the first passage and the second passage;
wherein the first passage and the second passage are substantially straight and not parallel to each other;
wherein the first blade and the second blade each comprise an edge capable of generating an incision on the surface of the strap, hence in the plastic material, and thereby wedge the strap in place in a respective one of the first passage and the second passage; and
wherein upon pulling the strap in a direction opposite the one direction, the blade will wedge the strap in place in a respective one of the first passage and the second passage.

9. The connector of claim 8, further comprising:
a body having a first section and a second section, wherein the first section comprises the first passage and the second section comprises the second passage, further wherein the first section comprises a vertical wall and the second section comprises a vertical wall distinct from and facing the vertical wall of the first section; and
a bridge joining the first section and the second section of the body by extending between the vertical wall of the first section and the vertical wall of the second section.

10. The connector of claim 9, wherein the body is made of a first material and the first blade and the second blade are made from a second material different from the first material.

11. The connector of claim 10, wherein the first material is a moldable material.

12. The connector of claim 11, wherein the second material is one of a metal and a metallic alloy.

13. The connector of claim 8, wherein the connector comprises a tearable attachment releasably attaching the connector to a neighbor connector in a connector chain, wherein the tearable attachment is tearable by a user to release the connector from the connector chain.

14. A connector to be used with a strap for wrapping an object, the strap being detached from the connector and having a first extremity and a second extremity, the connector comprising:
a first passage adapted to insert and to lock the first extremity of the strap therein;
a second passage having an entrance adapted to insert the second extremity of the strap therein and to prevent the strap from travelling toward the entrance upon insertion in the second passage;
a body having a first section and a second section, wherein the first section comprises the first passage and the second section comprises the second passage, further wherein the first section comprises a vertical wall and the second section comprises a vertical wall distinct from and facing the vertical wall of the first section; and
a bridge joining the first section and the second section of the body by extending between the vertical wall of the first section and the vertical wall of the second section,
wherein the connector comprises a tearable attachment releasably attaching the connector to a neighbor connector in a connector chain, wherein the tearable attachment is tearable by a user to release the connector from the connector chain.

15. The connector of claim 14, wherein each of the first passage and the second passage has a blade, namely a first blade and a second blade, which are oriented such that the strap is able to travel only in one direction in the first passage and the second passage; and wherein upon pulling the strap in a direction opposite the one direction, the blade will wedge the strap in place in a respective one of the first passage and the second passage.

16. The connector of claim 15, wherein the body is made of a first material and the first blade and the second blade are made from a second material different from the first material.

17. The connector of claim 16, wherein the first material is a moldable material.

18. The connector of claim 17, wherein the second material is one of a metal and a metallic alloy.

19. The connector of claim 16, wherein the strap comprises a surface, and wherein the first blade and the second blade each comprise an edge capable of generating an incision on the surface of the strap and thereby wedge the strap in place in a respective one of the first passage and the second passage.

20. The connector of claim 15, wherein the first passage and the second passage are substantially straight and not parallel to each other.

* * * * *